UNITED STATES PATENT OFFICE.

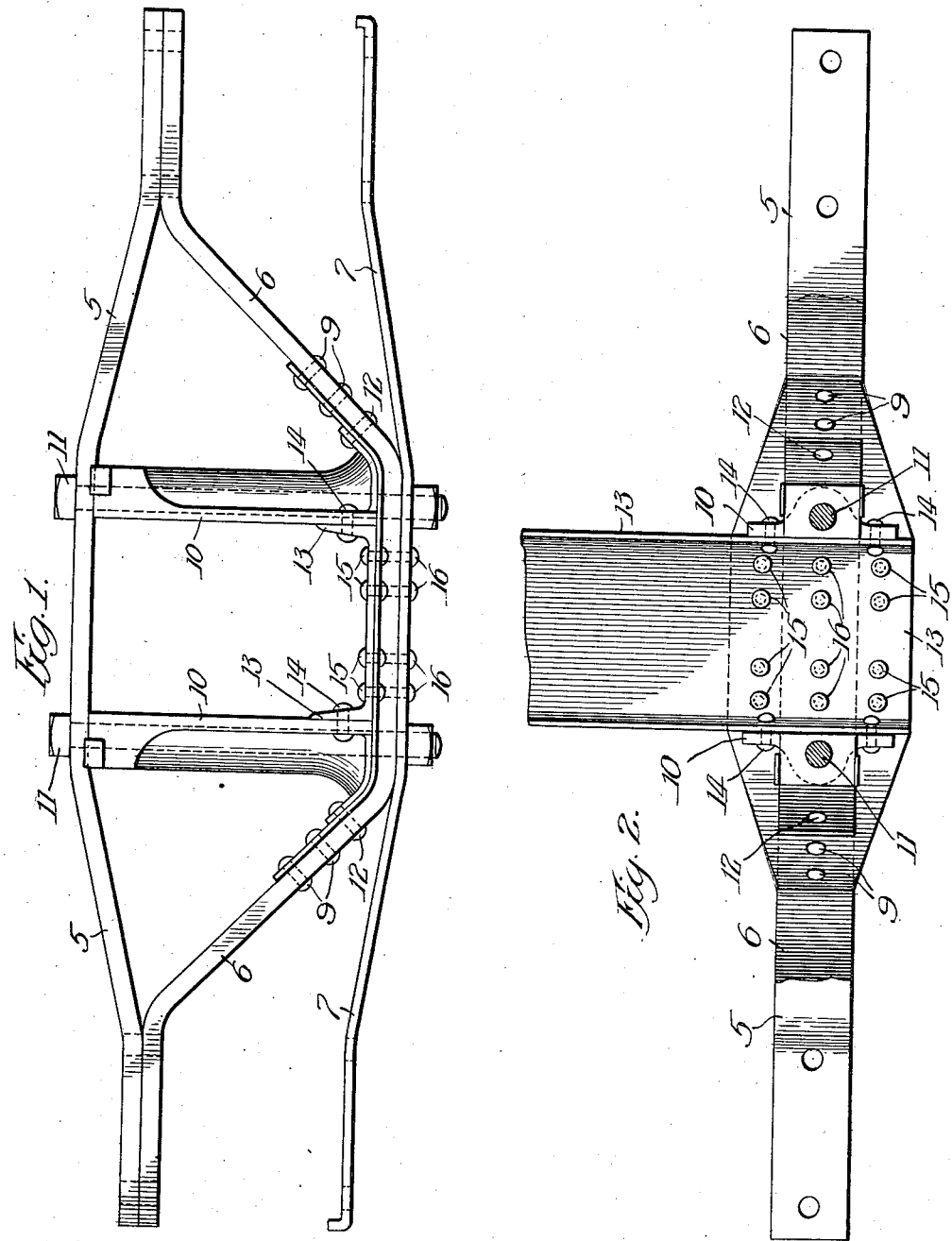

GEORGE G. FLOYD, OF GRANITE CITY, ILLINOIS, ASSIGNOR TO AMERICAN STEEL FOUNDRIES, OF NEW YORK, N. Y., A CORPORATION OF NEW JERSEY.

REINFORCED CAR-TRUCK.

1,010,035. Specification of Letters Patent. Patented Nov. 28, 1911.

Application filed February 23, 1911. Serial No. 610,136.

*To all whom it may concern:*

Be it known that I, GEORGE G. FLOYD, a citizen of the United States, residing at Granite City, in the county of Madison and State of Illinois, have invented certain new and useful Improvements in Reinforced Car-Trucks, of which the following is a specification.

This invention relates to car trucks and has for its object, to improve the construction, increase the strength and insure the rigidity thereof.

It has been found that car trucks as heretofore constructed would eventually under the stresses and strains of usage work loose at the joints of the various parts sufficiently to diminish the rigidity of the truck and permit the parts to give or yield slightly relatively to each other. By repeated and extended tests it has been demonstrated that when a truck loses its rigidity sufficiently to permit relative longitudinal movement between the sides of the truck a much greater expenditure of power is required to draw the truck around a curve than would be required to draw a rigid truck around the same curve. This is due to the fact that when the truck is deflected from a straight line movement upon rounding a curve the outer side of the truck will lag behind the inner side because of the frictional engagement between the wheel flanges and the outer rail, thus causing the truck axles to assume a diagonal position relatively to the rail—thereby increasing the angle between the outer wheel flanges and the outer rail, and, as this angle increases, the frictional resistance between the flanges and the rail will increase proportionately. It will thus be evident that a truck which has become loose at the joints so as to permit one side frame to lag behind the other will require much more power to draw it around a curve than a rigidly constructed truck which permits no relative movement between the side frames.

The principal object of the present invention is the provision of a car truck which shall be absolutely rigid and which shall be so constructed that the rigidity of the truck will be maintained even after severe and long continued usage.

The structure and resultant advantages of my invention will be apparent from the following description when read in connection with the accompanying drawings, in which—

Figure 1 is a side elevation of one embodiment of my invention; and Fig. 2 is a plan view with the top arch-bar broken away showing the columns in section.

Referring to the drawings, 5 indicates the upper arch-bar, 6 the inverted arch-bar, and 7 the side tie-bar of a railway truck, these arch-bars and tie-bar being of a well known shape and formation. Upon the upper face of the inverted arch-bar 6 there is disposed a gusset plate 8 which, near its center, is of greater width than the arch-bar and projects at either side thereof. From its wide central portion the gusset plate tapers toward the ends which are of substantially the same width as the arch-bar.

The vertical columns 10 are supported upon the bed of the gusset plate adjacent its upwardly bent ends and are held in position by the usual column bolts 11. The bases of the columns are shaped to conform to the curvature of the inverted arch-bar and gusset plate and are provided with laterally projecting ears which are fastened to the inclined portion of the inverted arch-bar by rivets 12 which firmly secure the arch-bar, the gusset plate and the bases of the columns together. Between the columns is arranged the channel-shaped spring plank 13 which connects the side frames of the truck. The spring plank fits snugly between the columns 10, and the upturned flanges are secured by rivets 14 to the flat faces of the columns, as shown in Fig. 2. It will be noted that the end of the spring plank projects beyond the inverted arch-bar to a position flush with the outer edge of the gusset plate. Upon each side of the arch-bar the spring plank is secured by rivets 15 to the gusset plate and, substantially upon the longitudinal axis of the arch-bar, a plurality of rivets 16 securely and fixedly bind the spring plank, the gusset plate, the inverted arch-bar and the tie-bar together.

By riveting the tie-bar, the gusset plate and the spring plank to the bed of the inverted arch-bar by a series of rivets which pass through all these members, it will be obvious that a strong and rigid construction is produced which is further strengthened by the rivets 15 connecting the spring plank and the gusset plate upon either side of the inverted arch-bar, so that twisting or relative angular movement of the spring plank relatively to the arch-bar is prevented. The gusset plate projects at either side of the arch-bar and the outer end of the spring plank is extended over the arch-bar in order that the spring plank and gusset plate may be riveted together at each side of the arch-bar thereby greatly increasing the strength and rigidity of the construction over those in which no gusset plate is employed or which embody a single gusset plate on the inner side of the arch-bar only. It will also be noted that further provision against twisting movement of the spring plank is made by securely riveting the sides of the spring plank to the columns, which columns are held against torsional movement on the gusset plate by the rivets 12. The construction as a whole produces a strong, durable and rigid structure adapted to obviate any relative movement between the side frames of the truck such as would permit lagging of one side of the truck behind the other.

It will be obvious to those skilled in the art that the invention is not limited to the exact construction shown and described and that the various parts are capable of considerable change and variation in size, shape, proportion and arrangement without departing from the spirit of the invention or sacrificing any of the material advantages thereof.

I claim:

1. In a car truck, the combination of an arch-bar, a gusset plate mounted thereon, one or more columns resting on said gusset plate, and a spring plank disposed upon said plate and between said columns, substantially as described.

2. In a car truck, the combination of an arch-bar, a spring plank projecting beyond said arch-bar, a gusset plate disposed between said arch-bar and said spring plank, said gusset plate being secured to the arch-bar on either side of said spring plank and also secured to said plank on either side of said arch-bar, substantially as described.

3. In a car truck, the combination of an arch-bar, a gusset plate carried by said arch-bar, a pair of columns and a spring plank supported on said gusset plate, and means for rigidly securing said arch-bar, columns and spring plank together, substantially as described.

4. In a car truck, the combination of an arch-bar, a gusset plate disposed thereon, a spring plank extending across said gusset plate, a column resting upon said gusset plate upon either side of said spring plank, said gusset plate being riveted to said arch-bar outside said columns and to the spring plank on each side of said arch-bar, substantially as described.

5. In a car truck, the combination of an arch-bar, a gusset plate carried thereby, a spring plank disposed across said gusset plate, means engaged with said arch-bar, gusset plate and spring plank for binding said arch-bar, gusset plate and spring plank together, and means for connecting said gusset plate and spring plank together upon each side of said arch bar, substantially as described.

6. In a car truck, the combination of an inverted arch-bar, a gusset plate carried thereby, a spring plank disposed across said gusset plate, said arch-bar, gusset plate and spring plank being riveted together, a column supported on said gusset plate at each side of the spring plank, said columns being riveted to the spring plank, and being riveted at their outer sides to the arch-bar and gusset plate, substantially as described.

7. In a car truck, the combination of an inverted arch-bar, a gusset plate riveted thereto at its ends, a spring plank resting upon said gusset plate, means passed through said spring plank, gusset plate and arch-bar for connecting the same together, means for fastening said spring plank and gusset plate together upon each side of the arch-bar, columns fastened to said spring plank, and means passed through said arch-bar and gusset plate and the bases of said columns for rigidly fastening the same together, substantially as described.

GEORGE G. FLOYD.

Witnesses:
E. B. SHERZER,
JAS. H. LOMÈ.

---

Copies of this patent may be obtained for five cents each, by addressing the "Commissioner of Patents Washington, D. C."